(12) United States Patent
Sotokawauchi

(10) Patent No.: US 9,931,783 B2
(45) Date of Patent: Apr. 3, 2018

(54) VACUUM FORMING APPARATUS AND VACUUM FORMING METHOD

(71) Applicant: TOYOTA BOSHOKU KABUSHIKI KAISHA, Aichi-ken (JP)

(72) Inventor: Makoto Sotokawauchi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 766 days.

(21) Appl. No.: 14/334,985

(22) Filed: Jul. 18, 2014

(65) Prior Publication Data

US 2015/0076745 A1 Mar. 19, 2015

(30) Foreign Application Priority Data

Sep. 17, 2013 (JP) ................. 2013-191493

(51) Int. Cl.

| | |
|---|---|
| B29C 51/10 | (2006.01) |
| B29C 51/08 | (2006.01) |
| B29C 51/42 | (2006.01) |
| B29K 105/00 | (2006.01) |
| B29L 31/30 | (2006.01) |
| B29C 51/16 | (2006.01) |

(Continued)

(52) U.S. Cl.
CPC ............ B29C 51/10 (2013.01); B29C 51/082 (2013.01); B29C 51/421 (2013.01); B29C 51/16 (2013.01); B29C 51/36 (2013.01); B29C 51/46 (2013.01); B29C 2791/001 (2013.01); B29C 2791/006 (2013.01); B29K 2105/0097 (2013.01); B29K 2105/256 (2013.01); B29L 2031/3005 (2013.01); B29L 2031/3041 (2013.01)

(58) Field of Classification Search
None
See application file for complete search history.

(56) References Cited

U.S. PATENT DOCUMENTS

| | | | |
|---|---|---|---|
| 2003/0146543 A1* | 8/2003 | Lebrun | ................. B29C 51/262 264/313 |
| 2009/0134543 A1* | 5/2009 | Umezawa | ........... B29C 37/0028 264/101 |

FOREIGN PATENT DOCUMENTS

| | | |
|---|---|---|
| JP | 07-304092 | 11/1995 |
| JP | 09-066396 | 3/1997 |
| JP | 2002-18940 | 1/2002 |

OTHER PUBLICATIONS

Office Action issued in Japan Counterpart Patent Appl. No. 2013-191493, dated Nov. 17, 2016, along with an English translation thereof.

* cited by examiner

Primary Examiner — Monica Huson
(74) Attorney, Agent, or Firm — Greenblum & Bernstein, P.L.C.

(57) ABSTRACT

A vacuum forming apparatus includes a die set including an upper die and a lower die. The upper die is configured to move in a horizontal direction from a normal position at which the upper die is initially set. The lower die includes a suction channel through which a vacuum is applied to a cover. The lower die is opposite the upper die that is at the normal position. The upper die is configured to move from the normal position to a space lateral to the lower die so as not to face the lower die after the die set is opened, and return to the normal position before the die set is closed. The lower die is configured to move downward during opening (Continued)

of the die set and upward during closing thereof. The die set is configured to form the base member with the cover into a predetermined shape.

7 Claims, 8 Drawing Sheets

(51) Int. Cl.
*B29C 51/36* (2006.01)
*B29C 51/46* (2006.01)

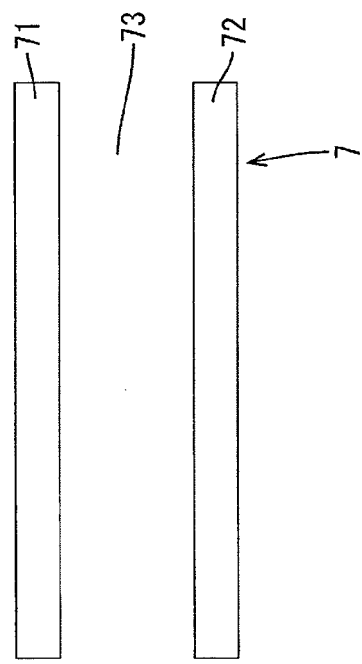
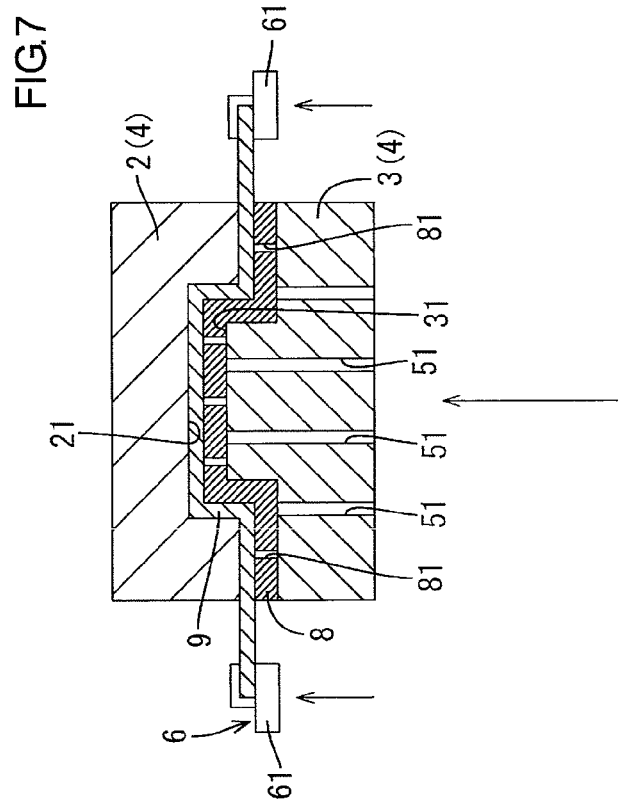
FIG.7

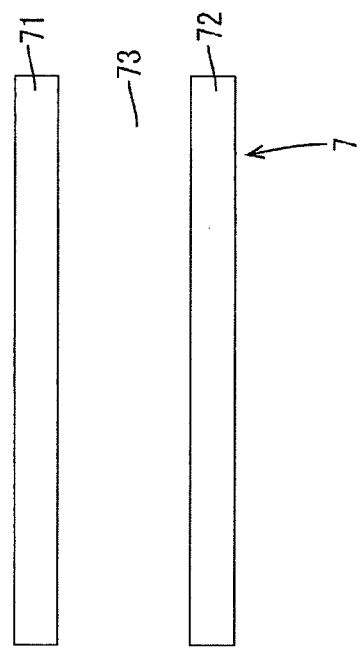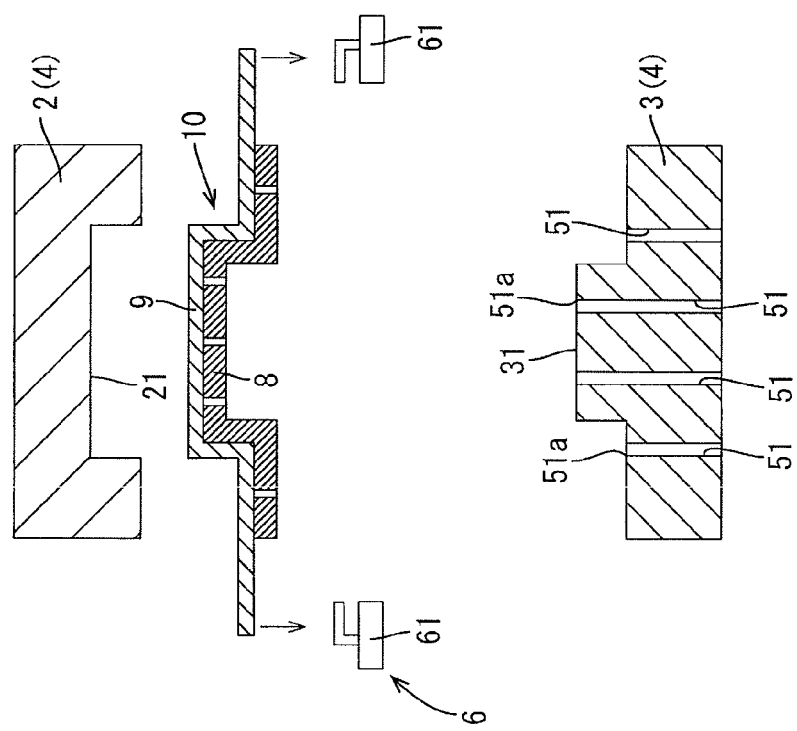

VACUUM FORMING APPARATUS AND VACUUM FORMING METHOD

CROSS REFERENCE TO RELATED APPLICATION

This application claims priority from Japanese Patent Application No. 2013-191493 filed on Sep. 17, 2013. The entire contents of the priority application are incorporated herein by reference.

TECHNICAL FIELD

The present disclosure relates to a vacuum forming apparatus and a vacuum forming method.

BACKGROUND

A method of forming interior parts of vehicles such as vehicle door trims using vacuum bonding to bond covers to surfaces of base members has been known. Such a method may be performed on a forming apparatus including a die set for forming a door trim while a base member and a cover are bonded together by pressure bonding. The die set of the apparatus includes an upper die and a lower die. The upper die and the lower die are moved in the vertical direction during open and close of the die set.

The forming apparatus including the upper die and the lower die that are movable in the vertical direction requires a considerable vertical size to allow the upper die and the lower die to move in the vertical direction and a considerable work space to set a forming object (e.g., a base member) between the upper die and the lower die of the die set that is open. Therefore, the forming apparatus having such a configuration tends to have a large vertical size.

An object is to provide a vacuum forming apparatus having a smaller vertical size in comparison to known vacuum forming apparatus and a vacuum forming method using the vacuum forming apparatus.

SUMMARY

A vacuum forming apparatus is for bonding a cover to a base member using vacuum bonding. The vacuum forming apparatus includes a die set. The die set includes an upper die and a lower die. The upper die is configured to move in the horizontal direction from a normal position at which the upper die is initially set. The lower die includes a suction channel through which a vacuum is applied to the cover to establish intimate contact between the base member and the cover when the die set is closed. The lower die is opposite the upper die in the vertical direction when the upper die is at the normal position. The upper die is configured to move from the normal position to a space lateral to the lower die so as not to be opposite the lower die after the die set is opened and to return to the normal position before the die set is closed. The lower die is configured to move downward away from the upper die during opening of the die set. The lower die is configured to move upward toward the upper die during closing of the die set. The die set is configured to from the base member with the cover into a predetermined shape with the upper die and the lower die holding the base member and the cover therebetween.

BRIEF DESCRIPTION OF THE DRAWINGS

FIG. 7 is an explanatory view schematically illustrating a general configuration of the vacuum forming apparatus in which a die set is closed.

FIG. 8 is an explanatory view schematically illustrating a general configuration of the vacuum forming apparatus in which the die set is open and an interior part is removed from the die set.

DETAILED DESCRIPTION

First Embodiment

Figure 1:
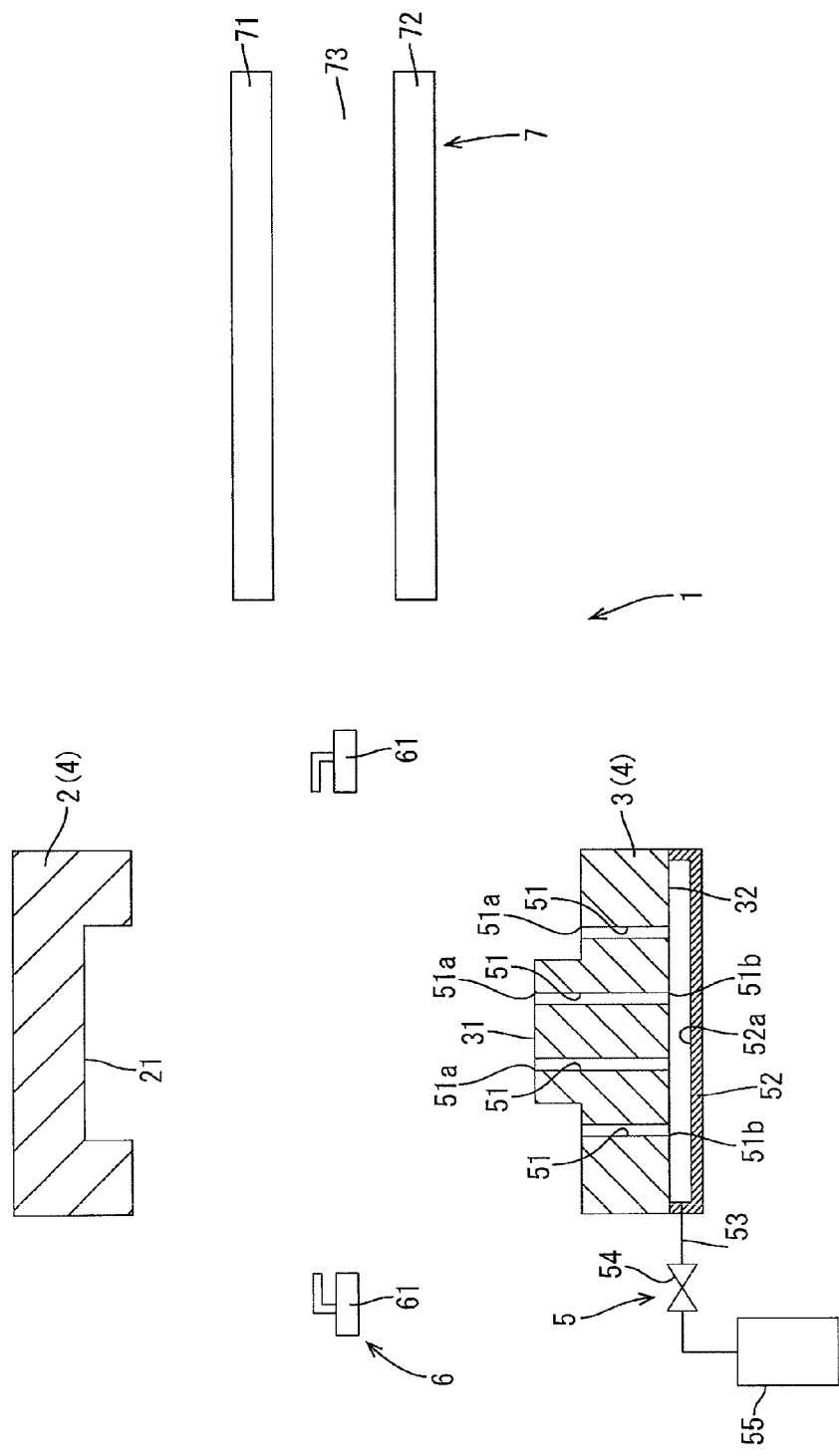
FIG. 1 is an explanatory view schematically illustrating a general configuration of a vacuum forming apparatus.

A first embodiment will be described with reference to FIGS. 1 to 8. Specifically, a vacuum forming apparatus 1 and a vacuum forming method using the vacuum forming apparatus 1 will be described. The vacuum forming apparatus 1 is configured to form vehicle interior parts (e.g. vehicle door trims) using vacuum bonding to bond covers to surfaces of base members. The vacuum bonding is a method of bonding a cover to a base member while a vacuum is applied to the cover. The top-bottom direction and the right-left direction in each drawing correspond to the vertical direction and the horizontal direction, respectively.

The vacuum forming apparatus 1 includes a die set 4, a vacuum aspiration system 5, a clamping unit 6, and a heating unit 7. The die set 4 includes an upper die 2 and a lower die 3. The vacuum forming apparatus 1 is installed on a flat floor.

The upper die 2 and the lower die 3 are away from each other when the die set 4 is open as illustrated in FIG. 1. The upper die 2 includes a concave work surface 21. The upper die 2 is orientated such that the work surface 21 faces downward. The upper die 2 is held at a predefined height so as not to move in the vertical direction. The upper die 2 is movable in the horizontal direction, which will be described in detail later.

The lower die 3 is disposed below the upper die 2 that is at a normal position. An upper surface 31 of the lower die 3 is a convex work surface that faces upward and opposite the work surface 21 of the upper die 2. The lower die 3 is movable in the vertical direction. The lower die 3 moves up toward the upper die 2 during closing of the die set 4 and down away from the upper die 2 during opening of the die set 4. The lower die 3 is fixed to an up-and-down unit configured to move up and down with a servo mechanism. The lower die 3 moves up and down along with the up-and-down unit. An up-and-down unit having a different configuration may be used for moving up and down the lower die 3. For example, an up-and-down unit including a fluid pressure cylinder such as a hydraulic cylinder and an air cylinder may be used.

The vacuum aspiration system 5 includes suction channels 51 in the lower die 3, a suction tray 52, a pipe 53, a valve 54, and a vacuum tank 55.

Each suction channel 51 extends from a lower surface 32 of the lower die 3 to the upper surface 31 in the vertical direction. A first opening 51a of each suction channel 51 is in the upper surface 31. First openings 51a of the suction channels 51 are arranged predetermined distance away from each other in the upper surface 31. Second openings 51b are in the lower surface 32 of the lower die 3.

The suction tray 52 is made of material different from that of the lower die 3. The suction tray 52 has a shallow box-like shape with an opening. The suction tray 52 is attached to the lower surface 32 of the lower die 3 so as to cover the lower surface 32 and to define a space 52a with the lower surface 32. The space 52a communicates with the suction channels 51 and with the pipe 53.

A first end of the pipe 53 is connected to the suction tray 52 so as to communicate with the space 52a. A second end of the pipe 53 is connected to the vacuum tank 55 so as to be communicable with the vacuum tank 55. The valve 54 is connected in the middle of the pipe 53. The valve 54 adjusts a volume of suction air drawn from the suction channels 51. Open and closure of the valve 54 is controlled by a controller. The vacuum tank 55 is connected to a suction inlet of a vacuum pump. The vacuum tank 55 has an internal pressure that is reduced when the vacuum pump is driven. When the valve 54 is opened to draw suction air from the suction channels 51 under the condition that the internal pressure of the vacuum tank 55 is reduced, a vacuum is applied to a cover 9 in the die set 4 through the suction channels 51. With the vacuum, the cover 9 establishes intimate contact with the surface of a base member 8 in the die set 4. In the drawings except for FIG. 1, the vacuum aspiration system 5 is omitted for simple illustrative purposes.

The clamping unit 6 is configured to clamp the cover 9. The clamping unit 6 includes a clamp 61 having a frame-like shape. The clamp 61 holds edges of the cover 9 such that the cover 9 spreads in horizontal directions. The clamp 61 is configured to switch between holding position and releasing position according to reciprocating motion of a cylinder. In the holding position, the clamp 61 clamps the cover 9. In the releasing position, the clamp 61 releases the cover 9. The reciprocating motion of the cylinder is controlled by a controller.

The clamping unit 6 includes an up-and-down unit configured to move up and down the clamp 61 in the vertical direction with a servo mechanism. The clamp 61 is movable from a lower position to an upper position toward the upper die 2 during the closing of the die set 4. The clamping unit 6 includes a sliding mechanism configured to slide the clamp 61 in the horizontal direction. The clamp 61 can be moved in the horizontal direction from an initial position above the lower die 3 into the heating unit 7 in a space lateral to the lower die 3 to heat the cover by the heating unit 7. Up-and-down motion of the clamp 61 in the vertical direction and reciprocating motion thereof in the horizontal direction are controlled by a controller. The clamping unit 6 and the lower die 3 are configured such that motions thereof in the vertical direction are independently controllable.

The heating unit 7 is provided for preheating the cover 9 clamped with the clamp 61 of the clamping unit 6 to soften the cover 9 prior to a farming process. As illustrated in FIG. 1, the heating unit 7 is disposed adjacent to a side of the die set 4 and at a height lower than the upper die 2. The heating unit 7 includes an upper heating element 71 and a lower heating element 72. Each of the upper heating element 71 and the lower heating element 72 has a plate-like shape. The upper heating element 71 and the lower heating element 72 are opposed to each other with a predetermined distance therebetween to define a space 73 for holding the cover 9 held by the clamp 61 therein during heating of the cover 9. The upper heating element 71 and the lower heating element 72 include far infrared heaters, respectively. The upper heating element 71 is arranged above the clamping unit 6 (or the clamp 61) which is at the initial position when the die set 4 is open so that the cover 9 is heated from above. The lower heating element 72 is arranged below the clamping unit 6 (or the clamp 61) which is at the initial position when the die set 4 is open so that the cover 9 is heated from below. Namely, the heating unit 7 is configured to heat the cover 9 from both sides (from above and below). The heating unit 7 is held at a predefined height by a supporting device. The upper surface of the upper heating element 71 defines a lower boundary of an empty space above the upper heating element 71.

Operation of each component of the vacuum forming apparatus 1 and a method of forming a vehicle interior part 10 using the vacuum forming apparatus 1 will be described. The method of forming the vehicle interior part 10 uses vacuum bonding for bonding the cover 9 to a surface of the base member 8. The method may be referred to as a vacuum forming method.

The vacuum forming apparatus 1 in an initial state is illustrated in FIG. 1. In the vacuum forming apparatus 1 in the initial state, the die set 4 is open and the lower die 3 is at the lowest position, which is a predefined distance away from the upper die 2. This position is referred to as the initial position of the lower die 3. The position of the upper die 2 when the vacuum forming apparatus 1 is in the initial state is referred to as the normal position (or a forming position) of the upper die 2. When the upper die 2 is at the normal position, the upper surface 31 of the lower die 3 is opposite the upper die 2.

The distance between the upper die 2 and the lower die 3 when the die set 4 is open is predetermined to an extent that a formed component can be removed from the die set 4. In the known apparatus, a considerable distance is required between the upper die and the lower die for an easy access to the lower die when placing the base member on the lower die. According to the configuration of this embodiment, a large distance is not required between the upper die 2 and the lower die 3. When the vacuum forming apparatus 1 is in the initial state, the base member 8 is not yet placed on the lower die 3.

In the vacuum forming apparatus 1 in the initial state, the vertical position of the clamp 61 of the clamping unit 6 is about the middle between the upper die 2 and the lower die 3 and about the same as a space 73 in the heating unit 7 adjacent to the die set 4. The horizontal position of the clamp 61 is set such that the upper die 2 and the lower die 3 are inside the clamp 61 when viewed from above. The position of the clamping unit 6 (or the clamp 61) when the vacuum forming apparatus 1 is in the initial state may be referred to as an initial position of the clamping unit 6 (see FIG. 1).

Process of Moving the Upper Die 2 to the Space Lateral to the Lower Die 3

Figure 2:
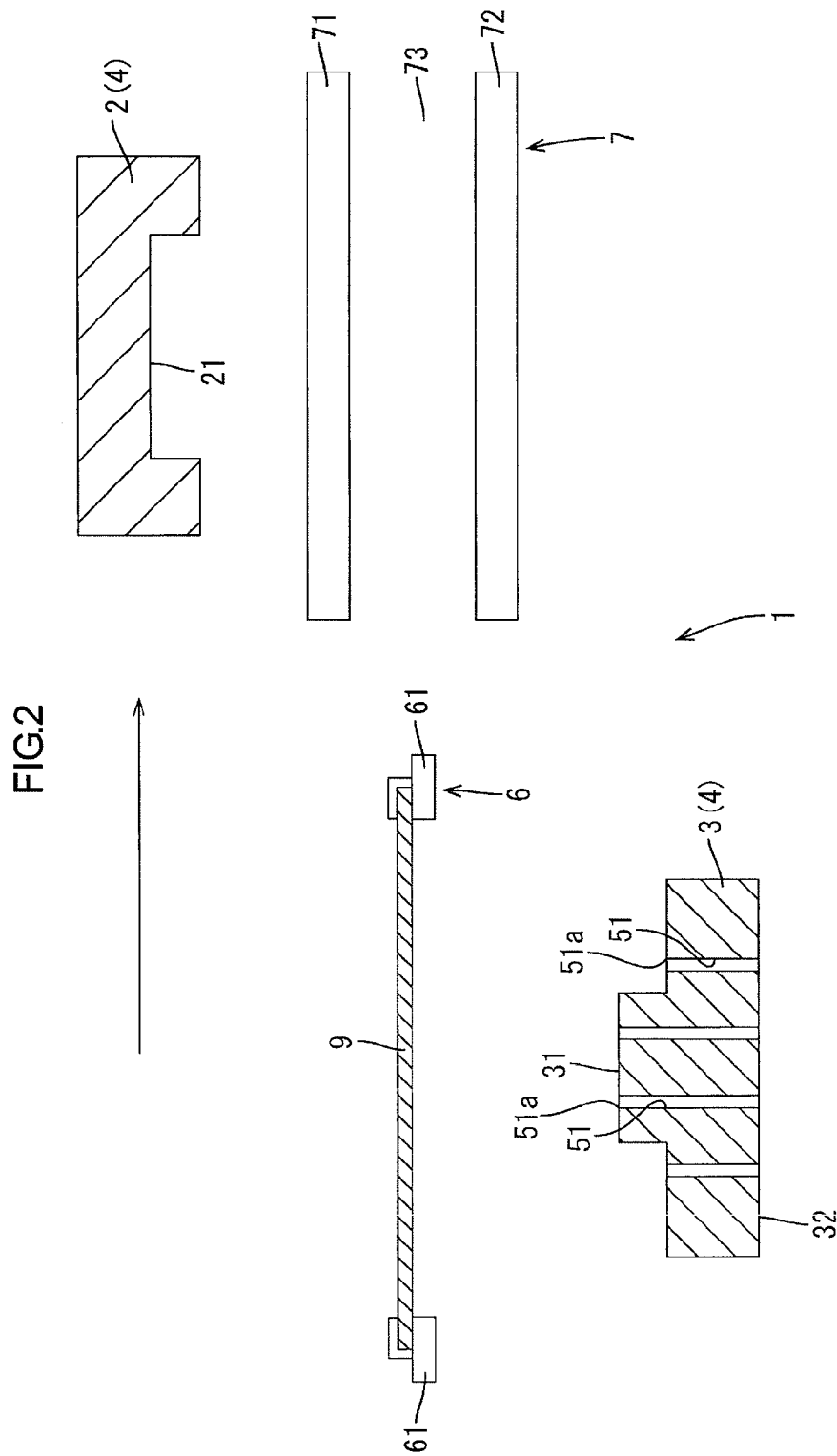
FIG. 2 is an explanatory view schematically illustrating a general configuration of the vacuum forming apparatus in which an upper die is moved to an empty space above a heating unit.

During operation, the state of the vacuum forming apparatus 1 is shifted from an initial state to a die cleared state in which the upper die 2 is in the empty space above the heating unit 7 as illustrated in FIG. 2. Specifically, the upper die 2 is moved in the horizontal direction from the normal position to the empty space above the heating unit 7. The upper die 2 is held at the position above the heating unit 7 for a predetermined period of time. The position above the heating unit 7 and lateral to the lower die 3, at which the upper die 2 is held, is referred to as a standby position (a cleared position). A state of the vacuum forming apparatus 1 (or a state of the die set 4) in which the upper die 2 is at the standby position may be referred to as the die cleared state.

Process of Clamping the Cover 9 with the Clamp 61 of the Clamping Unit 6

After the state of the vacuum forming apparatus 1 is shifted from the initial state to the die cleared state, the cover 9 is clamped with the clamp 61 of the clamping unit 6. As illustrated in FIG. 2, when the vacuum forming apparatus 1 is in the die cleared state, a clearance is created above the clamping unit 6 in a space above the lower die 3 by moving the upper die 2 to the empty space above the heating unit 7 lateral to the lower die 3. Therefore, the cover 9 can be easily attached to the clamping unit 6 without obstruction by the upper die 2.

Process of Moving the Clamping Unit 6 to the Heating Unit 7

Figure 3:
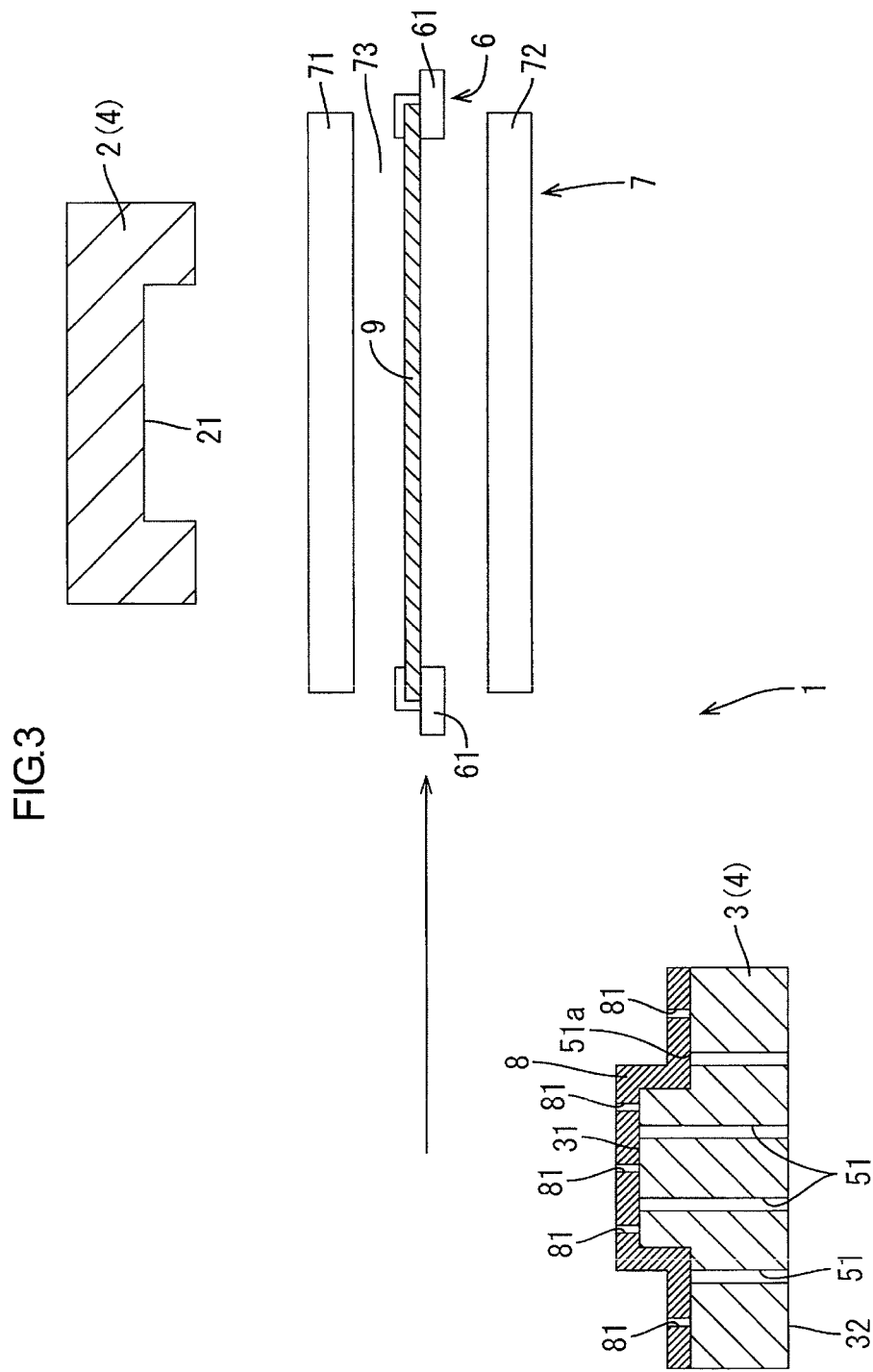
FIG. 3 is an explanatory view schematically illustrating a general configuration of the vacuum forming apparatus in which a clamping unit is moved into the heating unit.

As illustrated in FIG. 3, the clamping unit 6 is moved in the horizontal direction from the initial position to the space 73 in the heating unit 7 while holding the cover 9 with the clamp 61. Namely, the clamping unit 6 is moved from the initial position to the side. The position at which the clamping unit 6 is held in the space 73 of the heating unit 7 may be referred to as a heating position.

Process of Heating the Cover 9

The cover 9 is heated and softened by the heating unit 7 prior to the forming process using the die set 4. The cover 9 includes a vinyl chloride sheet lined with a polypropylene form layer. The cover 9 has thermoplastic properties. The cover 9 that is heated and softened prior to the forming process more easily fits along with a shape of the surface of the base member 8. As a result, the cover 9 is intimately attached to the surface of the base member 8. Conditions to heat the cover 9 including temperature and heating duration are set according to the shape and the kind of material of the cover 9.

Process of Placing the Base Member 8 on the Lower Die 3

In the vacuum forming apparatus 1 in the die cleared state, after the clamping unit 6 is moved from the initial position to the heating position, the base member 8 is placed on the lower die 3, more specifically, the base member 8 is placed on the upper surface 31 of the lower die 3. When the clamping unit 6 is moved from the initial position to the heating position, a clearance is created above the lower die 3. As described earlier, the clearance is created above the clamping unit 6 in the space above the lower die 3 by moving the upper die 2 to the standby position. By moving the clamping unit 6 from the initial position to the heating position, the space above the lower die 3 is totally cleared. With the clearance created by moving the upper die 2 and the clamping unit 6 to the space lateral to the lower die 3, placing of the base member 8 on the lower die 3 can be more easily performed.

The base member 8 is placed on the upper surface 31 of the lower die 3 so as to cover the first openings 51a of the suction channels 51 in the upper surface 31.

The base member 8 is made of material having thermoplastic properties such as polypropylene. The base member 8 is formed in advance in a shape similar to the upper surface 31. An adhesive is applied to a surface of the base member 8, to which the cover 9 is to be attached, prior to placing the base member 8 on the lower die 3. The adhesive on the base member 8 may be dried with a drying oven as necessary. The base member 8 includes through holes 81 each extend in the thickness direction of the base member 8. The through holes 81 are provided for exerting negative pressure applied through the suction channels 51 to the cover 9.

Figure 4:
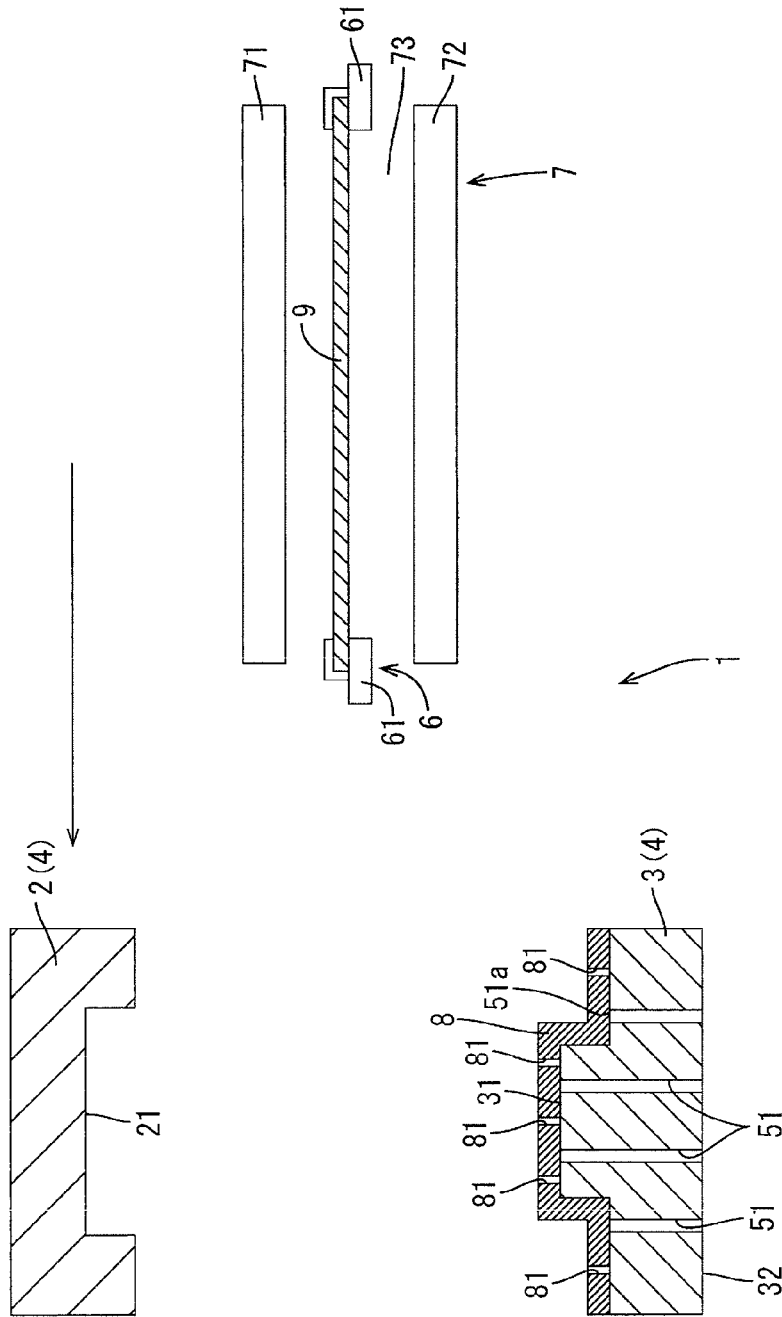
FIG. 4 is an explanatory view schematically illustrating a general configuration of the vacuum forming apparatus in which the upper die is returned to a normal position.

Process of Returning the Upper Die 2 from the Standby Position to the Normal Position The upper die 2 is returned from the standby position to the normal position as illustrated in FIG. 4. After the base member 8 is placed on the lower die 3, the upper die 2 in the standby position above the heating unit 7 is moved in the horizontal direction from the standby position to the normal position. The upper die 2 is returned to the normal position prior to closing of the die set 4, that is, before the forming process is started.

Process of Returning the Clamping Unit 6 to the Initial Position

Figure 5:
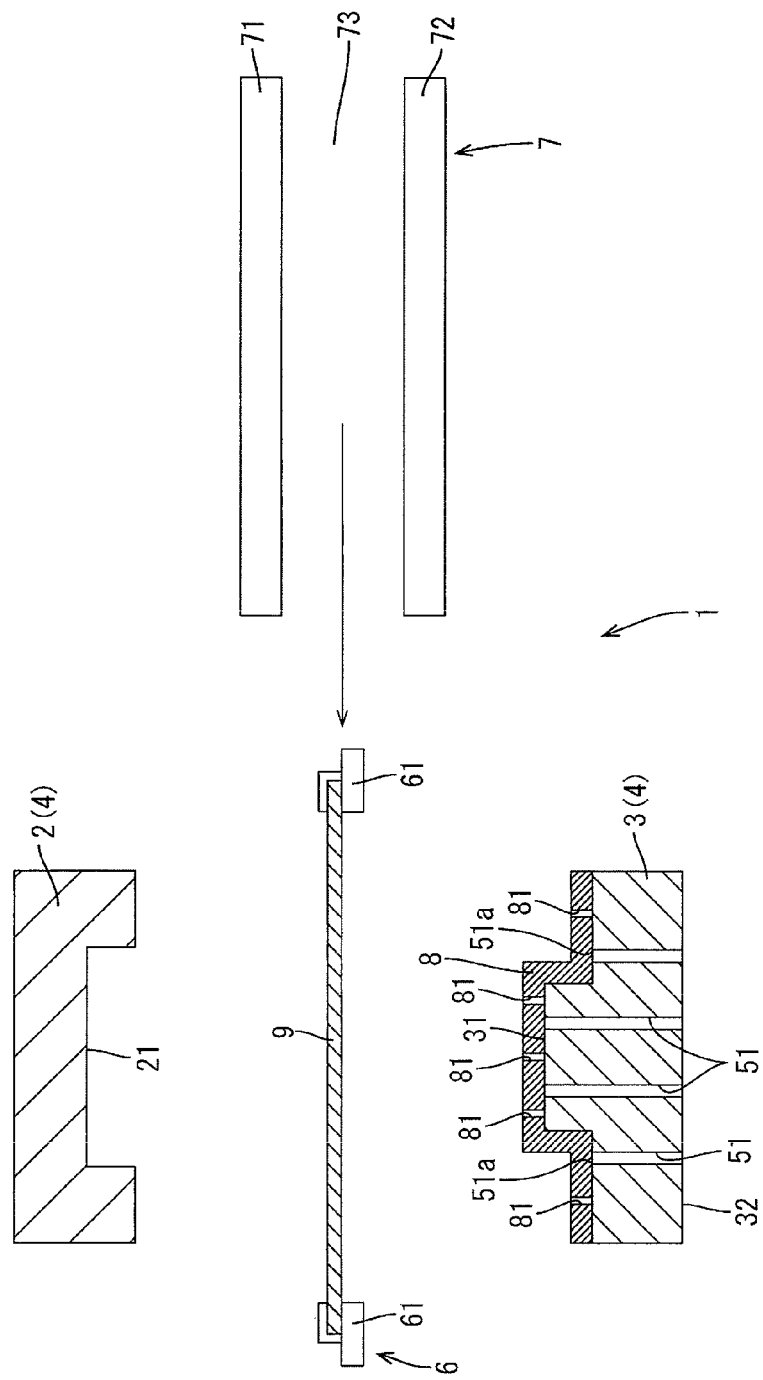
FIG. 5 is an explanatory view schematically illustrating a general configuration of the vacuum forming apparatus in which the clamping unit is returned to an initial position.

The clamping unit 6 is returned to the initial position as illustrated in FIG. 5. After the cover 9 clamped with the clamp 61 of the clamping unit 6 is heated by the heating unit 7 and the base member 8 is placed on the lower die 3, the clamping unit 6 is moved in the horizontal direction from the heating position to the initial position. The vacuum forming apparatus 1 is configured such that the clamping unit 6 is returned to the initial position after the upper die 2 is returned to the normal position. The vacuum forming apparatus 1 may be configured such that the clamping unit 6 is returned to the initial position before the upper die 2 is returned to the normal position.

Process of Pushing Up the Cover 9 by the Lower Die 3 Via the Base Member 8

Figure 6:
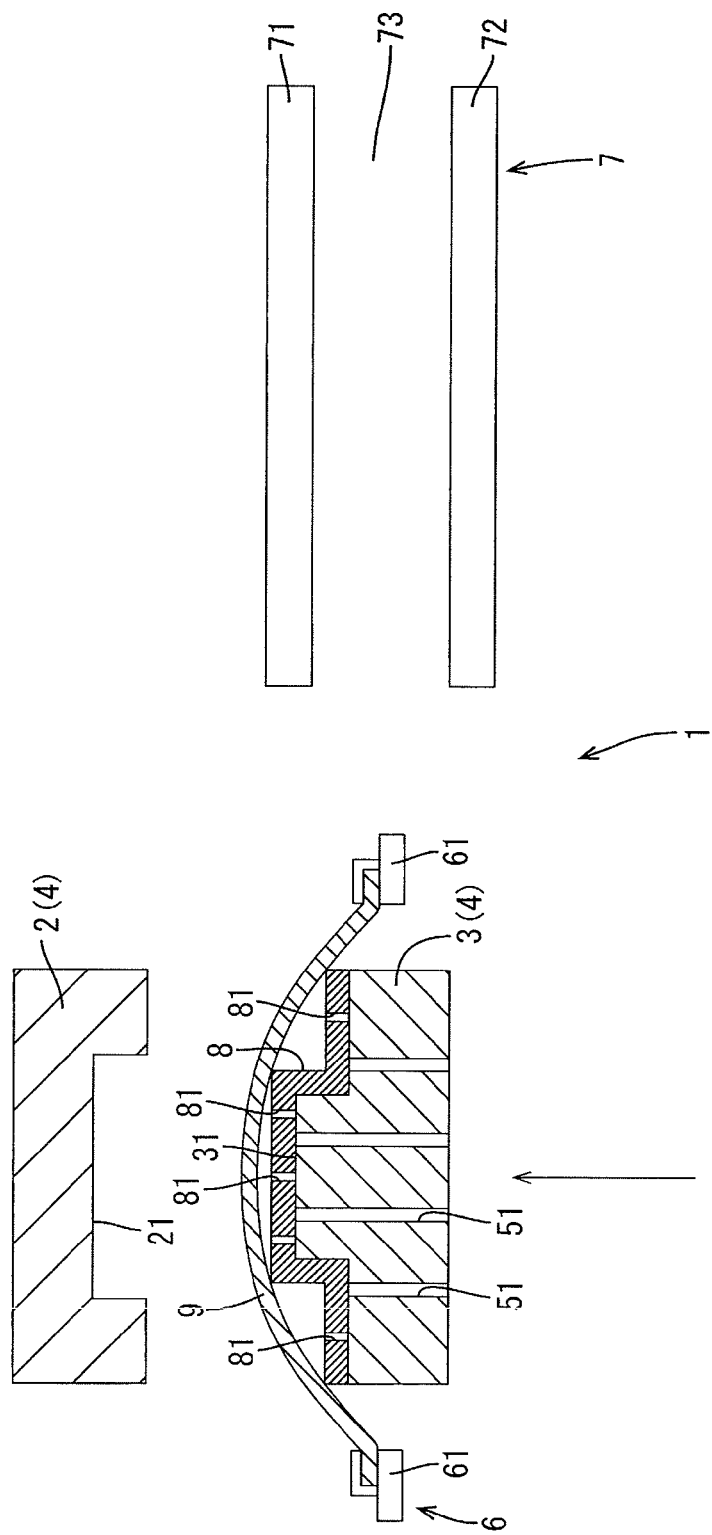
FIG. 6 is an explanatory view schematically illustrating a general configuration of the vacuum forming apparatus in which a lower die pushes a cover upward via a base member.

After the upper die 2 and the clamping unit 6 are returned to the normal position and the initial position, respectively, the lower die 3 is moved up from the initial position toward the upper die 2 to push up the softened cover 9 via the base member 8 as illustrated in FIG. 6. Prior to the forming process of the base member 8 and the cover 9, that is, before the die set 4 is closed, the base member 8 is pressed against the lower surface of the cover 9. Because the cover 9 is softened by the heating unit 7, the cover 9 changes its form along the surface of the base member 8 when pushed by the base member 8. By pushing the cover 9 upward with the base member 8, the cover 9 can be easily formed into a shape along the surface of the base member 9 when the die set 4 is closed, that is, during the forming process.

During pushing of the cover 9 by the lower die 3 via the base member 8, the lower die 3 is inside the clamp 61 where the cover 9 spreads. The lower die 3 may be configured to move faster than the clamping unit 6 such that a portion of the cover 9 is pushed by an upper portion of the lower die 3, which is moved above the clamp 61, as illustrated in FIG. 6.

The motion of the lower die 3 is halted for a predetermined period of time to maintain the cover 9 pushed upward. The position at which the lower die 3 (see FIG. 6) is held is referred to as a pushup position. The pushup position is between the initial position of the lower die 3 and a closed position of the lower die 3, which will be described later.

Process of Closing the Die Set 4 (Forming Process)

The die set 4 is closed as illustrated in FIG. 7. After the lower die 3 is held at the pushup position for the predetermined period of time to maintain the cover 9 pushed upward, the clamping unit 6 and the lower die 3 are moved up toward the upper die 2. The base member 8 and the cover 9 are layered and held between the upper die 2 and the lower die 3. Under this condition, the upper die 2 and the lower die 3 are fitted together and the die set 4 is closed as illustrated in FIG. 7.

During the closing of the die set 4, the lower die 3 is further moved up from the pushup position illustrated in FIG. 6 while the cover 9 is continuously pushed up by the base member 8. In this situation, the clamping unit 6 is moved up from the initial position along with the lower die 3 and arranged adjacent to the upper die 2. The clamping unit 6 is at the middle between the upper die 2 and the lower die 3 when the die set 4 is closed. A position of the lower die 3 when the die set 4 is closed is referred to as the closed position of the lower die 3. A position of the clamping unit 6 when the die set 4 is closed is referred to as a forming position of the clamping unit 6.

The base member 8 and the cover 9 are held between the concave work surface 21 of the upper die 2 and the convex upper surface 31 of the lower die 3 when the die set 4 is closed. The cover 9 is forced against the surface of the base member 8, to which the adhesive is applied, by a vacuum applied through the suction channels 51 in the lower die 3 and the through holes 81 in the base member 8. As a result, the cover 9 is intimately attached to the surface of the base member 8. A vacuum (or a negative pressure) is applied to an internal space of the die set 4, which is closed, through the suction channels 51. When the base member 8 and the cover 9 are sandwiched between the upper die 2 and the lower die 3 while the vacuum is applied to the cover 9, the cover 9 is intimately attached to the surface of the base member 8 and bonded thereto along the shape of the surface of the base member 8.

The vacuum forming apparatus 1 is configured such that the upper die 2 does not move in the vertical direction and remains at the normal position when the die set 4 is closed.

Process of Opening the Die Set 4

After the die set 4 is closed for a predetermined period of time, the application of the vacuum to the internal space of the die set 4 stops. Then, the die set 4 is opened. The cover 9 is released from the clamping unit 6 after the die set 4 is opened and then a formed component 10 including the base member 8 and the cover 9 is removed from the upper die 2. During the opening of the die set 4, the lower die 3 is moved from the closed position down toward the initial position. The die set 4 includes a removal mechanism including push-out pins for removal of the formed component 10. The die set 4 is opened and the formed component 10 is removed from the upper die 2 as illustrated in FIG. 8. After the formed component 10 is removed, the vacuum forming apparatus 1 returns to the initial state illustrated in FIG. 1.

The vacuum forming apparatus 1 is configured to bond the cover 9 to the base member 8 while the cover 9 is forced against the surface of the base member 8 by a vacuum. The vacuum forming apparatus 1 includes the upper die 2 and the lower die 3. The lower die 3 includes the suction channels 51 through which the vacuum is applied to the cover 9 when the die set 4 is closed so that the cover 9 is intimately attached to the base member 8. The vacuum forming apparatus 1 is configured such that the lower die 3 operates as follows. During the opening of the die set 4, the lower die 3 moves downward away from the upper die 2 while remains opposite the upper die 2. During the closing of the die set 4, the lower die 3 moves upward toward the upper die 2 while remains opposite the upper die 2. The vacuum forming apparatus 1 is configured such that the base member 8 and the cover 9 are sandwiched between the upper die 2 and the lower die 3 and formed in a predetermined shape when the die set 4 is closed. The vacuum forming apparatus 1 is configured such that the upper die 2 moves in the horizontal direction to the space lateral to the lower die 3 so as not to oppose the lower die 3 when the die set 4 is open, and returns to the normal position when the die set 4 is closed.

The clearance is created above the lower die 3 by moving the upper die 2 and the clamping unit 6 to the side, that is, a work space for placing the base member 8 on the lower die 3 is created. The upper die 2 and the clamping unit 6 are less likely to be obstacles to the placing of the base member 8 on the lower die 3. If the vacuum forming apparatus 1 is configured such that the upper die 2 and the clamping unit 6 remain above the lower die 3 when the die set 4 is opened, a considerable distance is required between the upper die 2 and the lower die 3 for placing the base member 8 on the lower die 3. Namely, a stroke of the lower die 3 and a vertical size of the die set 4 in the open state need to be considered. However, the vacuum forming apparatus 1 is configured such that the upper die 2 and the clamping unit 6 are moved to the space lateral to the lower die 3 when the die set 4 is opened and thus it is not necessary to consider the stroke of the lower die 3 or the vertical size of the die set 4. With this configuration, the height (vertical size) of the vacuum forming apparatus 1 can be reduced. Therefore, a recessed installation space that is prepared by recessing a floor to make a so-called pit is not required for installing the vacuum forming apparatus 1 in a facility and thus burden and cost of installation of the vacuum forming apparatus 1 can be reduced.

With the clamping unit 6, the vertical position of the cover 9 can be properly adjusted. Therefore, the base member 8 and the cover 9 are properly held between the upper die 2 and the lower die 3 and properly formed. In the vacuum forming apparatus 1, a work space for clamping the cover 9 with the clamp 61 of the clamping unit 6 is created above the clamping unit 6 by moving the upper die 2 to the empty space above the heating unit 7 lateral to the lower die 3. When the cover 9 is fixed to the clamping unit 6, the upper die 2 is less likely to be an obstacle to the fixing of the cover 9 to the clamping unit 6. If the vacuum forming apparatus 1 is configured such that the upper die 2 remains above the clamping unit 6 when the die set 4 is opened, a considerable distance is required between the upper die 2 and the lower die 3 for fixing the cover 9 to the clamping unit 6. The stroke of the lower die 3 and the vertical size of the die set 4 in the open state need to be considered. However, the vacuum forming apparatus 1 is configured such that the upper die 2 is moved to the side when the die set 4 is opened and thus it is not necessary to consider the stroke of the lower die 3 or the vertical size of the die set 4. With this configuration, the height (vertical size) of the vacuum forming apparatus 1 can be reduced even through the vacuum forming apparatus 1 includes the clamping unit 6.

Furthermore, the empty space above the heating unit 7 can be used for holding the upper die 2 at the standby position to clear the space above the lower die 3. Therefore, not only the vertical size but also the width (horizontal size) of the vacuum forming apparatus 1 can be reduced. Because the clamping unit 6 is movable in the horizontal direction from the initial position to the heating unit 7 after the upper die 2 is moved to the standby position, the space above the lower die 3 is further cleared. Namely, the work space for placing the base member 8 on the lower die 3 is created. With this configuration, the clamping unit 6 is less likely to be an obstacle to the placing of the base member 8 on the lower die 3.

A vacuum forming method includes the process of moving the upper die 2 to the standby position, the process of moving the clamping unit 6 to the heating unit 7, the process of placing the base member 8 on the lower die 3, the process of returning the clamping unit 6 to the initial position, and the process of returning the upper die 2 to the normal position. With this method, the base member 8 is placed on the lower die 3 after the upper die 2 and the clamping unit 6 are moved to the space lateral to the lower die 3. Therefore, the upper die 2 and the clamping unit 6 are less likely to be obstacles to the placing of the base member 8 on the lower die 3, that is, the base member 8 is less likely to collide with the upper die 2 or the clamping unit 6 and thus the base member 8 is less likely to be damaged.

Other Embodiments

The technology described herein is not limited to the above embodiments described in the above description and the drawings. The technology described herein may include the following embodiments.

(1) The vacuum forming apparatus 1 may be used for forming instrument panels or other interior components of vehicles.

(2) Covers having different properties may be used. For example, a cover that exerts adhesiveness when softened may be attached to the base member.

(3) The vacuum forming apparatus 1 may be configured such that the upper die 2 is moved to a space lateral to the other side of the lower die 3 from the heating unit 7. In terms of a reduction in overall size of the vacuum forming apparatus 1, effective utilization of space may be considered. Namely, it is preferable to use the space above the heating unit 7 for holding the upper die 2 lateral to the lower die 3.

(4) The upper die 2 may include suction channels 51.

The invention claimed is:

1. A vacuum forming apparatus for bonding a cover to a base member using vacuum bonding, the vacuum forming apparatus comprising
a die set including:
an upper die configured to move in a horizontal direction from a normal position at which the upper die is initially set; and
a lower die including a suction channel through which a vacuum is applied to the cover to establish intimate contact between the base member and the cover when the die set is closed and being opposite the upper die in a vertical direction when the upper die is at the normal position,
wherein the upper die is configured to:
move from the normal position to a space lateral to the lower die so as not to be opposite the lower die after the die set is opened; and
return to the normal position before the die set is closed,
wherein the lower die is configured to:
move downward away from the upper die during opening of the die set; and
move upward toward the upper die during closing of the die set, and
wherein the die set is configured to form the base member with the cover into a predetermined shape with the upper die and the lower die holding the base member and the cover therebetween; and
a clamping unit set at an initial position between the upper die and the lower die in the vacuum forming apparatus that is in an initial state, the clamping unit including a clamp having a frame shape and configured to hold edges of the cover such that the cover spreads on a horizontal plane.

2. The vacuum forming apparatus according to claim 1, wherein the clamping unit is
set at the initial position between the upper die and the lower die when the die set is open,
adjacent to the upper die when the die set is closed, and configured to move from the initial position toward the upper die during the closing of the die set.

3. The vacuum forming apparatus according to claim 2, further comprising a heating unit disposed at a height lower than the upper die in the space lateral to the lower die and configured to heat the cover,
wherein the upper die is configured to move to a position above the heating unit after the die set is opened, and
wherein the clamping unit is configured to move in the horizontal direction from the initial position to the heating unit to heat the cover prior to a forming process after the upper die is positioned above the heating unit.

4. The vacuum forming apparatus according to claim 1, further comprising:
the clamping unit
including a sliding mechanism configured to slide the clamp in the horizontal direction;
a heating unit
disposed lateral to and at a height higher than an upper surface of the lower die,
including an upper heating element and a lower heating element each having a plate-like shape and opposed to each other with a predetermined distance therebetween so as to define a space for holding the cover held by the clamp therein during heating of the cover,
wherein an upper surface of the upper heating element defines a lower boundary of an empty space thereabove,
a vacuum aspiration system
including a suction tray, a pipe, a valve, and a vacuum tank,
wherein the suction tray has a shallow box-like shape with an opening and is attached to a lower surface of the lower die so as to cover the lower surface of the lower die and to define a suction space with the lower surface,
wherein a first end of the pipe is connected to the suction tray so as to communicate with the space inside the suction tray and a second end of the pipe is connected to the vacuum tank so as to be communicable with the vacuum tank,
wherein the vacuum tank having an internal pressure that is controlled by an external device,
wherein the valve is connected in the middle of the pipe and configured to adjust a volume of suction air drawn from the suction channel under a condition that the internal pressure of the vacuum tank is reduced, and
wherein the upper die is configured to move in the horizontal direction from the normal position to the empty space above the upper heating element.

5. The vacuum forming apparatus according to claim 4, wherein the upper surface of the lower die is a work surface on which the base member is placed and opposite the upper die that is at the normal position, and
wherein the lower die includes a plurality of suction channels each of which is a through hole extending from the upper surface of the lower die to the lower surface of the lower die and through which a vacuum is applied to the cover to establish intimate contact between the base member and the cover when the die set is closed.

6. The vacuum forming apparatus according to claim 4, wherein the heating unit is positioned such that the upper surface of the upper heating element is located lower than the upper die.

7. The vacuum forming apparatus according to claim 4, wherein the initial position of the clamping unit is at a height between heights of the upper heating element and the lower heating element.

* * * * *